United States Patent [19]

Shimizu

[11] Patent Number: 5,093,389
[45] Date of Patent: Mar. 3, 1992

[54] ROOM TEMPERATURE-CURABLE COMPOSITION

[75] Inventor: Chiyuki Shimizu, Gunma, Japan

[73] Assignee: Toshiba Silicone Co., Ltd., Tokyo, Japan

[21] Appl. No.: 491,877

[22] Filed: Mar. 12, 1990

[30] Foreign Application Priority Data

Mar. 13, 1989 [JP] Japan .................................. 1-60228

[51] Int. Cl.$^5$ ................................................ C08K 9/10
[52] U.S. Cl. ................................. 523/210; 523/212; 523/213; 523/215; 523/216; 524/425; 524/445; 524/448; 524/431; 524/430; 524/860; 524/859; 524/789; 524/788; 524/588; 528/17; 528/18; 528/21; 528/33; 528/34
[58] Field of Search ............... 524/425, 445, 448, 431, 524/430, 860, 859, 789, 788, 588; 523/212, 213, 215, 216, 210; 528/17, 18, 21, 33, 34

[56] References Cited

U.S. PATENT DOCUMENTS 4,873,272 10/1989 Shimizu et al. ............... 524/859
4,996,112 2/1991 Perrin et al. ................... 524/425

*Primary Examiner*—Melvyn I. Marquis
*Attorney, Agent, or Firm*—Sughrue, Mion, Zinn, Macpeak & Seas

[57] ABSTRACT

A room temperature-curable composition comprising (A) a silanol-terminated polydiorganosiloxane having a viscosity measured at 25° C. of from 100 to 200,000 cSt, (B) an epoxy-terminated polyether, (C) an organosilicon compound, (D) an inorganic filler, and (E) a curing catalyst. The composition is suitably used as a building sealant which causes no fouling of the areas surrounding joints even after applied to the joints.

7 Claims, 2 Drawing Sheets

ROOM TEMPERATURE-CURABLE COMPOSITION

FIELD OF THE INVENTION

The present invention relates to a room temperature-curable composition especially useful as a building sealant which, after being applied to joints, causes no fouling of the areas surrounding the joints.

BACKGROUND OF THE INVENTION

Various silicone rubber compositions of the so-called room temperature-curable type are known which cure at room temperature into rubber-like elastomers. Since the elastomers obtained from such compositions have excellent weatherability, durability, heat resistance, and low temperature resistance, the room temperature-curable silicone rubber compositions are used in various fields, and especially in the field of building construction, they are acquiring importance as a gap-filling sealant for joints in outside walls of buildings.

However, conventional silicone sealants have a problem that after the sealants are applied to joints, polyorganosiloxanes contained as a major component in the sealants penetrate into the areas surrounding the joints and dust particles in the air adhere to the surrounding areas to foul the areas.

For the purpose of overcoming the above problem, a silicone sealant containing a surfactant having a polyoxyethylene group, a sorbitan residue, a disaccharide residue, or the like (JP-A-56-76452 and JP-A-56-76453) and a silicone sealant containing a surfactant having a fluorine atom (JP-A-58-167647 and JP-A-61-34062) have been proposed. (The term "JP-" as used herein means an "unexamined published Japanese patent application".) However, these silicone sealants are defective in that the antifouling effect thereof does not last for a sufficiently long period of time.

On the other hand, a room temperature-curable composition containing as an effective ingredient a polyether the main chain of which consists essentially of a polyether terminated by a hydrolyzable silyl group has also been conventionally used as a building sealant. (The above polyether is disclosed in, for example, JP-A-50-156599 and the above composition is disclosed in, for example, JP-A-52-73998.) Although this kind of sealants causes no fouling of joint-surrounding areas unlike the above-described silicone sealants, they are poor in weatherability so that they lose their function as a sealant in a relatively short period of time with impaired rubber elasticity and cracking.

For the purpose of overcoming the above problems, the present inventor previously found that a composition comprising a silanol-terminated polydiorganosiloxane, a polymer obtained by the reaction of an epoxy-terminated polyether with a heterocyclic compound having two imino groups per molecule and/or an aromatic or heterocyclic compound having two mercapto groups and also an organosilicon compound having an epoxy group and a hydrolyzable group, an inorganic filler, and a curing catalyst shows excellent antifouling properties for a long period of time and also has excellent weatherability (Japanese Patent Application No. 63-289240 filed on Nov. 16, 1989). However, this composition is disadvantageous in that the surface of cured elastomer obtained from the composition remains tacky to show slightly poor antifouling properties in the case where the composition is modified to produce a composition which gives a cured elastomer having high elongation, such composition being particularly useful as a building sealant, or where the composition is cured in a high temperature and high humidity atmosphere.

SUMMARY OF THE INVENTION

Accordingly, an object of the present invention is to provide a composition containing a polydiorganosiloxane as a main component, which, when used as a sealant, shows excellent weatherability and causes no fouling of joint-surrounding areas over a long period of time, thus eliminating the above-described problems.

The composition of the present invention is also advantageous in that where it is modified into a composition which gives a cured elastomer having a high elongation or where it is cured in a high temperature and high humidity atmosphere, the surface of the resulting cured elastomer does not remain tacky, and excellent antifouling properties can always be obtained.

DETAILED DESCRIPTION OF THE INVENTION

The room temperature-curable composition of the present invention comprises (A) 100 parts by weight of a silanol-terminated polydiorganosiloxane having a viscosity as measured at 25° C. of from 100 to 200,000 cSt;

(B) 5 to 500 parts by weight of a hydrolyzable silyl-terminated polymer obtained by the reaction of (I) an epoxy-terminated polyether represented by the general formula wherein $R^1$ and $R^2$ each represents a divalent hydrocarbon group and m is a number of 10 to 500, with (II) at least one compound selected from the group consisting of (i) a heterocyclic compound having two imino groups per molecule, each imino group being bonded to two different carbon atoms, (ii) an aromatic or heterocyclic compound having two mercapto groups bonded to carbon atoms constituting part of the aromatic or heterocyclic ring, and (III) an organosilicon compound having an epoxy group and a silicon-bonded hydrolyzable group;

(C) 0.05 to 60 parts by weight, per 100 parts by weight of the total of components (A) and (B), of an organosilicon compound having, on the average, more than 2 but less than 3 silicon-bonded organoaminoxy groups per molecule;

(D) 3 to 300 parts by weight, per 100 parts by weight of the total of components (A) and (B), of an inorganic filler; and

(E) 0.001 to 20 parts by weight, per 100 parts by weight of the total of components (A) and (B), of a curing catalyst.

The polydiorganosiloxane, component (A), is a silanol-terminated polydiorganosiloxane generally used as a main component of silicone sealant compositions. This polydiorganosiloxane should have a viscosity as measured at 25° C. of from 100 to 200,000 cSt in order to impart appropriate workability to the composition before curing and also impart excellent mechanical properties to a cured rubber-like elastomer obtained from the composition. If the viscosity thereof is below 100 cSt, the cured rubber-like elastomer shows insufficient elongation, while if it exceeds 200,000 cSt, a uniform composition cannot be obtained and the resulting composition shows poor workability. From the standpoint of a good balance between the properties of the composition before curing and those after curing, the preferred range of the viscosity thereof is from 500 to 50,000 cSt.

Examples of organic groups directly bonded to the silicon atoms in component (A) include an alkyl group such as methyl, ethyl, propyl, butyl or hexyl, an alkenyl group such as vinyl or allyl, an aryl group such as phenyl, an aralkyl group such as β-phenylethyl or β-phenylpropyl, and a substituted monovalent hydrocarbon group such as 3,3,3-trifluoropropyl, chloromethyl or β-cyanoethyl. From the standpoint of easy synthesis of the polydiorganosiloxane, a monovalent hydrocarbon group such as methyl, vinyl or phenyl is generally advantageous. Of these, methyl is particularly preferred because an intermediate for the polysiloxane can be most easily obtained and because the resulting polysiloxane has a lowest viscosity although having a sufficiently high degree of polymerization, so that the workability of the composition before curing and the physical properties of a cured rubber-like elastomer obtained from the composition can be well balanced. Therefore, it is preferred that 85% or more of all the organic groups are methyl, and it is more preferred that substantially all the organic groups are methyl.

Component (B) is a hydrolyzable silyl-terminated polymer which is obtained by reacting (I) an epoxy-terminated polyether represented by the formula wherein $R^1$ and $R^2$ each represents a divalent hydrocarbon group and m is a number of 10 to 500, with (II) at least one compound selected from the group consisting of (i) a heterocyclic compound having two imino groups per molecule, each imino group being bonded to two different carbon atoms,

(ii) an aromatic or heterocyclic compound having two mercapto groups bonded to carbon atoms constituting part of the aromatic or heterocyclic ring, and (III) an organosilicon compound having an epoxy group and a silicon-bonded hydrolyzable group.

The epoxy-terminated polyether (I) is an essential component in order to obtain long-lasting antifouling effect which is the characteristic of the present invention.

In the polyether of the above formula, the oxyalkylene unit represented by $R^1O$ is preferably an oxyethylene unit, an oxypropylene unit, or a combination thereof, because such oxyalkylene unit is effective in imparting good antifouling properties to the final composition. The degree of polymerization (m) of the oxyalkylene unit is in the range of from 10 to 500. If m is smaller than 10, it is difficult to obtain a cured elastomer having a sufficient elongation, while if m is larger than 500, the long-lasting antifouling properties which are the characteristic of the present invention are impaired.

Examples of the divalent hydrocarbon group of $R^2$ include methylene, ethylene, trimethylene, tetramethylene, phenylene, cyclohexylene, and a group represented by

Of these, methylene is preferred from the standpoint of easy availability of raw materials.

Representative examples of the above polyether (I) include a polymer obtained by condensing hydroxyl-terminated polyoxyethylene or polyoxypropylene with epichlorohydrin in the presence of a basic catalyst or the like.

The compound (II)-(i) is a heterocyclic compound having imino groups which react with epoxy groups in the polyether (I) and in the organosilicon compound (III). Specifically, the compound (II)-(i) is a heterocyclic compound having two imino groups per molecule, each imino group being bonded to two different carbon atoms. Examples of such compound (II)-(i) from the standpoint of easiness in synthesis or availability are as follows:

perhydro-1,3,5-oxadiazine 1,3-di-(4-piperidyl)propane and perhydro-1,3,5-thiadiazine

Of these, piperazine is particularly recommended from the standpoint of easy availability of raw materials.

The compound (II)-(ii) is one having two mercapto groups per molecule which also react with epoxy groups in the polyether (I) and in the organosilicon compound (III). In order to obtain long-lasting antifouling properties which are the characteristic of the present invention, the compound (II)-(ii) should be an aromatic or heterocyclic compound in which the mercapto groups are bonded to carbon atoms constituting part of the aromatic or heterocyclic ring. Recommended as such compound (II)-(ii) are 2,5-dimercapto-1,3,4-thiadiazole, dimercaptobenzene, dimercaptotoluene, dimercaptoxylene, dimercaptonaphthalene, and the like, because of easy availability of raw materials and because the polymer (B) can be easily synthesized in a high yield due to the good reactivity of these compounds with epoxy groups. Of those, 2,5-dimercapto-1,3,4-thiadiazole is particularly preferred for the above reasons. The compound (II)-(i) and compound (II)-(ii) can be used alone or in combination thereof.

The organosilicon compound (III) is one having an epoxy group which reacts with an imino group in the compound (II)-(i) or a mercapto group in the compound (II)-(ii) and also having a silicon-bonded hydrolyzable group.

Preferred examples of such organosilicon compound (III) include compounds represented by the formula wherein $R^3$ represents the same divalent hydrocarbon group as defined in $R^2$ or an unhydrolyzable divalent hydrocarbon group having a structure in which at least one of the methylene group(s) constituting the main chain of the above divalent hydrocarbon group has been replaced by an atom and/or atoms of oxygen, nitrogen and sulfur, $R^4$ represents a monovalent hydrocarbon group, Y represents a silicon-bonded hydrolyzable group, and a is a number of 1 to 3.

In the above formula, $R^3$ is the same divalent hydrocarbon group as defined in $R^2$ or an unhydrolyzable divalent hydrocarbon group having a structure in which part of the methylene groups constituting the main chain of the above divalent hydrocarbon group has been replaced by an atom or atoms of O, N and S.

The unhydrolyzable divalent hydrocarbon group is, for example, a group represented by the formula —(CH$_2$)$_q$—Z—(R$^8$)—, wherein R$^8$ represents the same divalent hydrocarbon group as defined in R$^2$, Z represents an atom or atoms of O, N and S, and q is an integer of 1 to 10.

Examples of the monovalent hydrocarbon group of $R^4$ include an alkyl group, an alkenyl group, an aryl group, and an aralkyl group. Preferred of these from the standpoints of easy availability of raw materials and easy synthesis are, for example, methyl, ethyl, propyl, butyl, pentyl, hexyl, cyclohexyl, vinyl, allyl, phenyl and β-phenylethyl. Of these, methyl is particularly preferred from the standpoint of availability of raw materials.

Examples of the silicon-bonded hydrolyzable group of Y include an alkoxy group, an alkoxyalkoxy group, an acyloxy group, an N,N-dialkylamino group, an N-alkylamido group, an N,N-dialkylaminoxy group, a ketoxime group, and an alkenoxy group. However, an alkoxy group having 1 to 6 carbon atoms such as methoxy, ethoxy, propoxy, isopropoxy or hexyloxy, and 2-methoxyethoxy are advantageous from the standpoints of easy availability, reactivity, and anticorrosion of the hydrolyzate to metals. Of those, methoxy and ethoxy are preferred because they are highly hydrolyzable (i.e., the final composition shows good curability), with methoxy being particularly preferred. The number, a, of such hydrolyzable group is from 1 to 3, but is preferably 2 for obtaining a cured elastomer having high elongation.

Of the above-described examples of the compound (III) represented by the formulas above, organosilicon compounds represented by the formula wherein $R^4$ is the same as defined above, $R^5$ represents an alkyl group having 1 to 6 carbon atoms, $R^6$ and $R^7$ each represents a divalent hydrocarbon group, and a is the same as defined above, are particularly preferred from the standpoints of easy synthesis and easy availability of raw materials.

Examples of $R^6$ and $R^7$ are the same as defined in $R^2$ and $R^3$, respectively. However, $R^6$ is preferably methylene from the standpoint of easy availability of raw materials, while $R^7$ is preferably ethylene, trimethylene or tetramethylene and more preferably trimethylene, from the standpoint of easiness in synthesis and availability of raw materials. The group of $R^5O$, i.e., alkoxy group, and "a" are the same as described hereinbefore.

Specific examples of the organosilicon compound (III) include β-glycidoxyethyltrimethoxysilane, γ-glycidoxypropyltrimethoxysilane, δ-glycidoxybutyltrimethoxysilane, β-glycidoxyethyltriethoxysilane, γ-glycidoxypropyltriethoxysilane, δ-glycidoxybutyltriethoxysilane, methyl(β-glycidoxyethyl)dimethoxysilane, methyl(γ-glycidoxypropyl)dimethoxysilane, methyl(δ-glycidoxybutyl)dimethoxysilane, methyl(β-glycidoxyethyl)diethoxysilane, methyl(γ-glycidoxypropyl)diethoxysilane, methyl(δ-glycidoxybutyl)diethoxysilane, phenyl(β-glycidoxyethyl)dimethoxysilane, phenyl(γ-glycidoxypropyl)dimethoxysilane, phenyl(δ-glycidoxybutyl)dimethoxysilane, dimethyl(β-glycidoxyethyl)- methoxysilane, dimethyl(γ-glycidoxypropyl)methoxysilane, dimethyl(δ-glycidoxybutyl)methoxysilane, β-(3,4-epoxycyclohexyl)ethyltrimethoxysilane, β-(3,4-epoxycyclohexyl)ethyltriethoxysilane, methyl-β-(3,4-epoxycyclohexyl)ethyldimethoxysilane, phenyl-β-(3,4-epoxycyclohexyl)ethyldimethoxysilane, and dimethyl-β-(3,4-epoxycyclohexyl)ethylmethoxysilane.

Component (B) contained in the composition of this invention is a polymer obtained by the reaction of epoxy groups in the polyether (I) and in the organosilicon compound (III), both described above, with imino groups in the compound (II)-(i) and/or mercapto groups in the compound (II)-(ii).

The reaction of the polyether (I) with the organosilicon compound (III) and the compound (II)-(i) and/or the compound (II)-(ii) is preferably carried out at a temperature higher than ambient temperatures, for example, at 50° to 150° C. In this case, it is preferred to use, as a reaction accelerator, methanol, ethanol, phenol, salicylic acid, tris(dimethylaminomethyl)phenol, benzylmethylamine, tributylamine, 2-methylimidazole, or a similar compound. Methanol is one of the most preferred reaction accelerators. Although it is not necessary to use a solvent in the above reaction, a hydrocarbon-type, ether-type, ester-type solvent or the like may be used.

The amounts of the polyether (I), compound (II), and organosilicon compound (III) to be reacted with each other are theoretically such that the molar ratio of (I):(II):(III) is p:(p+1):2, wherein p is an integer of 1 or larger. In practice, however, (II) and (III) may be used in amounts slightly larger than the respective theoretical amounts to the amount of (I).

In conducting the reaction, the polyether (I), compound (II), and organosilicon compound (III) may be simultaneously introduced into the reaction system and reacted. However, for controlling a degree of polymerization and ensuring incorporation of a hydrolyzable group into the terminals of the molecular chains of the resulting polymer, it is preferred that the polyether (I) be first reacted with the compound (II) to increase the chain length, the amount of the compound (II) being more than one equivalent to (I) and being an appropriate amount for obtaining a polymer having a molecular weight in the range of from 1,000 to 50,000, and the organosilicon compound (III) be then added in an amount equal to or slightly larger than the theoretical amount and reacted.

As component (B), either of a polymer obtained from (I), (II)-(i) and (III) and a polymer obtained from (I), (II)-(ii) and (III) may be added to the composition of this invention. Alternatively, both polymers may be used in combination as component (B).

The molecular weight of component (B) is preferably from 1,000 to 50,000. If the molecular weight thereof is lower than 1,000, a cured elastomer obtained from the composition shows elongation lower than that which sealants are required to have. On the other hand, if the molecular weight thereof is higher than 50,000, the resulting composition have a too high viscosity, so that its workability is impaired.

The amount of component (B) in the composition of this invention is in the range of from 5 to 500 parts by weight, preferably from 30 to 300 parts by weight, per 100 parts by weight of component (A). If the amount of component (B) is smaller than 5 parts by weight, a sufficient antifouling effect cannot be produced. On the other hand, an amount thereof larger than 500 parts by weight is also not preferred because a cured elastomer obtained from the composition has poor weatherability.

Component (C) in the composition of this invention serves to give a cured elastomer having high elongation without remaining a tackiness on the surface of the elastomer, even where the composition is cured in a high temperature and high humidity atmosphere. Examples of the aminoxy group-containing organosilicon compound, component (C), include silane derivatives and straight-chain, branched or cyclic siloxane derivatives. Examples of the silicon-bonded organic group(s) include an alkyl group such as methyl, ethyl, propyl, butyl and hexyl, and an aryl group such as phenyl. The organosilicon compound (C) has, on the average, more than two silicon-bonded organoaminoxy groups per molecule for the purpose of preventing the surface of cured elastomer from remaining tacky, and at the same time, the number of such organoaminoxy groups is less than three per molecule on the average for the purpose of obtaining cured elastomer having high elongation.

In the organoaminoxy group in component (C), examples of the organic group(s) bonded to the nitrogen atom include two monovalent hydrocarbon groups such as methyl, ethyl, propyl, butyl or cyclohexyl, or one divalent hydrocarbon group such as tetramethylene or pentamethylene. Preferred of these are ethyl from the standpoints of easy availability of raw materials, easy synthesis of component (C), good reactivity, and high volatility of the organohydroxylamine released. As the organosilicon compound (C) having such organoaminoxy groups, the following compounds are described, in which the following abbreviations are used for organic groups;

Me: methyl group, Et: ethyl group, Bu: butyl group, Vi: vinyl group, Ph: phenyl group.

-continued

MeSi[OMe$_2$SiONEt$_2$]$_3$.

PhSi[OMe$_2$SiONEt$_2$]$_3$

The amount of component (C) in the composition of this invention is from 0.05 to 60 parts by weight, preferably from 0.5 to 20 parts by weight, per 100 parts by weight of the total of components (A) and (B). An amount of component (C) smaller than 0.5 part by weight is not preferred in that the effect of preventing the surface of cured elastomer from remaining tacky becomes poor, and an amount thereof larger than 60 parts by weight is also not preferred because the resulting composition shows poor antifouling properties and the rate of curing of the inner part of the composition becomes too low.

Component (D) in the composition of this invention serves to impart appropriate nonflowability and good strength to the composition. Examples of component (D) include fumed silica, precipitated silica, ground quartz, diatomaceous earth, calcium carbonate, titanium oxide, alumina, aluminum hydroxide, iron oxide, talc, clay, and carbon black. These inorganic fillers may also be used after being surface-treated with a fatty acid or an organosilicon compound such as trimethylchlorosilane, hexamethyldisilazane, hexamethylcyclotrisiloxane, octamethylcyclotetrasiloxane or silicone oil. The amount of component (D) in the composition is from 3 to 300 parts by weight, preferably from 5 to 200 parts by weight, per 100 parts by weight of the total of components (A) and (B). If the amount of component (D) is smaller than 3 parts by weight, nonflowability of the composition and reinforcing effect of component (D) cannot be obtained. If the amount thereof is larger than 300 parts by weight, the resulting composition has a too high viscosity so that its workability is impaired.

Examples of the curing catalyst, component (E), in the composition of this invention include tin carboxylates such as tin octylate; organotin carboxylates such as dibutyltin dilaurate, dibutyltin dimaleate or dibutyltin phthalate; organotin oxides and products of the reaction thereof with esters; organotitanates such as tetrabutyl titanate; amines; amine salts; quaternary ammonium salts; and guanidine compounds. The curing catalyst (E) is added to the composition in an amount of from 0.001 to 20 parts by weight per 100 parts by weight of the total of components (A) and (B). If the amount of component (E) added is less than the lower limit, a curing rate is too late, and such is unsuitable for practical use. On the other hand, an amount thereof larger than the upper limit is not preferred in that not only such a large amount is meaningless, but there is a fear of oozing or separating.

In the composition of this invention, a thixotropic agent such as hydrogenated castor oil, a plasticizer such as dioctyl phthalate, butyl benzyl phthalate or chlorinated paraffin, an ultraviolet absorber such as the benzotriazole or phenol type, and an antioxidant may be suitably added.

For the purpose of obtaining good storage stability, the above-described components (A) to (E) are generally stored in a multi-package form under the limitation that component (C) should be packaged separately from the other components and components (B) and (E) be packaged separately from each other. All the components thus stored are mixed into the composition of this invention before use.

The composition according to the present invention gives a cured elastomer which has high elongation and the surface of which does not remain tacky. A cured elastomer having such properties can be obtained even where the composition is cured in a high temperature and high humidity atmosphere. The cured elastomer also shows excellent weatherability and, hence, the composition of this invention is suitable for use as a building sealant. Furthermore, when the composition of the present invention is applied as a sealant to joints in outer walls of buildings, the composition applied cause no fouling of the joint-surrounding areas and the composition retains such antifouling properties for a long period of time, so that it contributes to long-lasting good appearances of the buildings.

The present invention will be explained below in more detail by reference to the following Examples and Comparative Examples, in which all parts and percents are by weight.

SYNTHESIS EXAMPLE 1

To 5 moles [10 (epoxy) equivalents] of glycidylterminated polyoxypropylene having an average degree of polymerization of 15, a molecular weight of about 1,000, and a viscosity as measured at 25° C. of 270 cSt were added 6 moles of piperazine of the formula and methanol in an amount corresponding to 10% of the amount of the polyoxypropylene. The resulting mixture was stirred at 60° C. under a nitrogen atmosphere. After initiation of the stirring at 60° C., part of the reaction mixture was taken out at intervals of 4 hours, and subjected to NMR analysis to examine the peak (2.67 ppm on the basis of tetramethylsilane) due to protons of epoxide methylene, potentiometric titration to determine the amount of imino group, and viscosity measurement at 25° C. 12 Hours after initiation of the stirring at 60° C., the peak due to protons of epoxide methylene disappeared and the viscosity of the mixture, which had been 80 cSt before the start of the stirring, was increased to 1,500 cSt. Therefore, 2.2 moles of methyl(γ-glycidoxypropyl)dimethoxysilane of the formula was added, and the resulting mixture was stirred under the same conditions as above. After the addition of the above silane, part of the reaction mixture was taken out at intervals of 4 hours and the amount of imino group in the sample was determined by potentiometric titration to examine the change of the amount thereof in the reaction mixture. As a result, 16 hours after the addition of the silane, imino group was no longer detected. Hence, the stirring with heating was stopped and the methanol was removed by evaporation, thereby obtaining a pale yellow viscous liquid. As a result of the NMR analysis of this reaction product, the peak due to protons of epoxide methylene was no longer observed. The pale yellow viscous liquid had a viscosity of 15,000 cSt at 25° C., a specific gravity of 1.01 at 25° C., and a number average molecular weight as measured by GPC of 6,000, and was ascertained to be a hydrolyzable silyl-terminated polyether (P-1) represented by the following formula.

SYNTHESIS EXAMPLE 2

To 5 moles [10 (epoxy) equivalents] of glycidyl-terminated polyoxypropylene having an average degree of polymerization of 32, a molecular weight of about 2,000, and a viscosity as measured at 25° C. of 550 cSt were added 6 moles of homopiperazine of the formula and ethanol in an amount corresponding to 10% of the amount of the polyoxypropylene. The resulting mixture was stirred at 80° C. under a nitrogen atmosphere. After initiation of the stirring at 80° C., part of the reaction mixture was taken out at intervals of 2 hours, and subjected to NMR analysis to examine the peak due to protons of epoxide methylene, potentiometric titration to determine the amount of imino group, and viscosity measurement at 25° C. 6 Hours after initiation of the stirring at 80° C., the amount of imino group determined by the titration was decreased by almost the theoretical value, and at the same time, the peak due to protons of epoxide methylene disappeared and the viscosity of the mixture, which had been 210 cSt before the start of the stirring, was increased to 4,000 cSt. Therefore, 2.2 moles of methyl(γ-glycidoxypropyl)diethoxysilane of the formula was added, and the resulting mixture was stirred under the same conditions as above. After the addition of the above silane, part of the reaction mixture was taken out at intervals of 2 hours, and subjected to potentiometric titration to determine the amount of imino group and NMR analysis to examine the peak due to protons of epoxide methylene. As a result, 8 hours after the addition of the silane, imino group was almost no longer detected and the peak almost disappeared. Hence, the stirring with heating was stopped and the ethanol was removed by evaporation. Thus, a pale yellow viscous liquid (hydrolyzable silyl-terminated polyether (P-2) represented by the formula below) having a viscosity of 26,000 cSt at 25° C., a specific gravity of 1.01 at 25° C., and a number-average molecular weight as measured by GPC of 11,000 was obtained.

SYNTHESIS EXAMPLE 3

To 3 moles [6 (epoxy) equivalents] of a glycidyl-terminated polyoxyethylene-polyoxypropylene copolymer having an average main chain structure represented by the formula and having a molecular weight of about 3,000 and a viscosity as measured at 25° C. of 1,010 cSt were added 4 moles of 2,5-dimercapto-1,3,4-thiadiazole represented by formula and methanol in an amount corresponding to 10% of the amount of the above copolymer. The resulting mixture was stirred at 60° C. under a nitrogen atmosphere. After initiation of the stirring at 60° C., part of the reaction mixture was taken out at intervals of 4 hours, and subjected to NMR analysis to examine the peak (2.67 ppm on the basis of tetramethylsilane) due to protons of epoxide methylene, and further to viscosity measurement at 25° C. 12 Hours after initiation of the stirring at 60° C., the peak due to protons of epoxide methylene disappeared and the viscosity of the mixture, which had been 390 cSt before the start of the stirring, was increased to 5,200 cSt. Therefore, 2.2 moles of methyl(γ-glycidoxypropyl)dimethoxysilane of the formula was added, and the resulting mixture was stirred under the same conditions as above. After the addition of the above silane, part of the reaction mixture was taken out at intervals of 4 hours and the amount of mercapto groups in the sample was determined by adding iodine to the sample to allow the iodine to react with the mercapto groups and performing back titration of the residual iodine with sodium thiosulfate. As a result, 12 hours after the addition of the silane, mercapto group was no longer detected. Hence, the stirring with heating was stopped and the methanol was removed by evaporation, thereby obtaining a pale yellow viscous liquid. This reaction product had a viscosity of 23,000 cSt at 25° C., a specific gravity of 1.01 at 25° C., and a number average molecular weight as measured by GPC of 9,900, and was ascertained to be a hydrolyzable silyl-terminated polyether (P-3) represented by the following formula.

PREPARATION EXAMPLE 1

To 100 parts of silanol-terminated polydimethylsiloxane having a viscosity as measured at 25° C. of 5,000 cSt were added 50 parts of heavy calcium carbonate having an average particle diameter of 1 μm, 50 parts of gluey calcium carbonate treated with stearic acid and having an average particle diameter of 0.05 μm, and 3 parts of hydrogenated castor oil. The resulting mixture was kneaded with a kneader to give a base compound (B-1).

PREPARATION EXAMPLE 2

To 100 parts of silanol-terminated polydimethylsiloxane having a viscosity as measured at 25° C. of 10,000 cSt were added 50 parts of light calcium carbonate treated with stearic acid and having an average particle diameter of 2.5 μm, 50 parts of gluey calcium carbonate treated with stearic acid and having an average particle diameter of 0.07 μm, and 3 parts of hydrogenated castor oil. The resulting mixture was kneaded with a kneader to give a base compound (B-2).

PREPARATION EXAMPLES 3 AND 4

To 100 parts of each of P-1 and P-2 obtained in Synthesis Examples 1 and 2, respectively, were added 50 parts of heavy calcium carbonate having an average particle diameter of 1 μm, 50 parts of gluey calcium carbonate treated with stearic acid and having an average particle diameter of 0.05 μm, and 3 parts of hydrogenated castor oil. Each of the resulting mixtures was kneaded with a kneader to give base compounds (B-3 and B-4).

PREPARATION EXAMPLE 5

To 100 parts of P-3 obtained in Synthesis Example 3 were added 50 parts of light calcium carbonate treated with stearic acid and having an average particle diameter of 2.5 μm, 50 parts of gluey calcium carbonate treated with stearic acid and having an average particle diameter of 0.07 μm, and 3 parts of hydrogenated castor oil. The resulting mixture was kneaded with a kneader to give a base compound (B-5).

EXAMPLES 1 TO 6 AND COMPARATIVE EXAMPLES 1 TO 5

Figure 1:
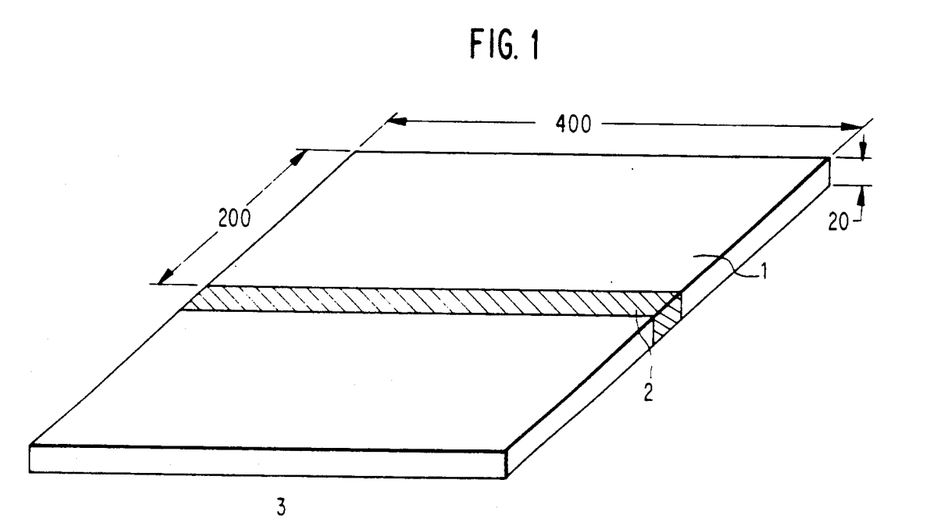
FIG. 1 is a diagrammatic view of a test piece which was subjected to outdoor exposure test in Examples and Comparative Examples.
Figure 2:
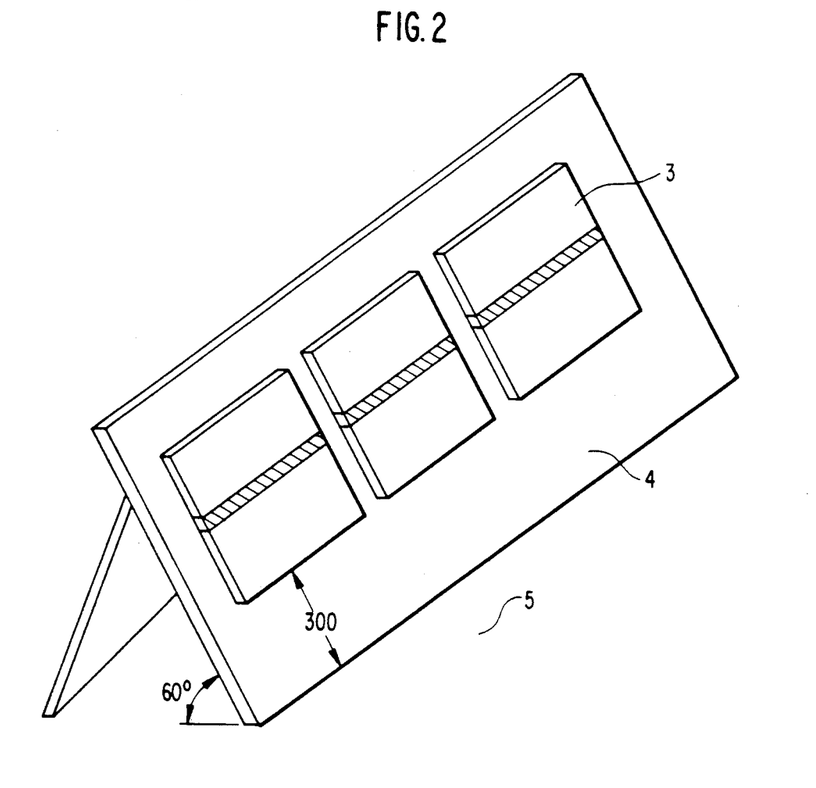
FIG. 2 is a diagrammatic view illustrating how the test piece was placed outdoors.
Figure 3:
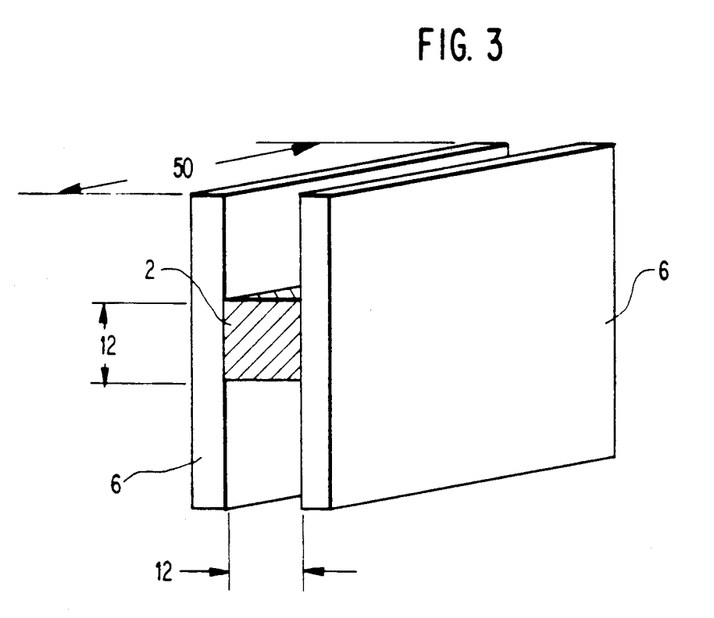
FIG. 3 is a diagrammatic view of a test piece which was subjected to tensile test in Examples and Comparative Examples.

The organoaminooxy group-containing organosilicon compounds and curing catalyst shown in Table 1 were added to base compounds B-1, B-2, B-3, and B-5 respectively obtained in Preparation Examples 1, 2, 3, and 5, thereby preparing composition samples 11 to 16. Using each of these samples, a test piece as shown in FIG. 1 was prepared, in which numeral 1 denotes a white enameled board, 2 a composition sample, and 3 a test piece for outdoor exposure, the unit of length being mm. Each test piece was cured in an atmosphere of 20° C., 50% RH for 2 weeks or in an atmosphere of 50° C., 80% RH for 1 week, and then examined for the state of the cured composition. The test pieces were then placed outdoors as shown in FIG. 2 and subjected to outdoor exposure. In FIG. 2, numeral 3 denotes a test piece for outdoor exposure, 4 a support board, and 5 the ground, the unit of length being mm. 6 Months and 12 months after initiation of the exposure, the degree of the fouling of the joint-surrounding area was determined on each test piece by reading the lightness of the area in terms of Munsell value. The results obtained are shown in Table 1. On the other hand, tensile test pieces of the structure as shown in FIG. 3 were prepared by using composition samples 11 to 16. In FIG. 3, numeral 2 denotes a composition sample and 6 an aluminum plate, the unit of length being mm. These test pieces were aged at 20° C., 50% RH for 2 weeks and then subjected to a tensile test. The results of the tensile test are also shown in Table 1. It is noted that in Comparative Example 5, the composition was prepared without using the polymer obtained from a polyether, while in Comparative Examples 1 to 4, the compositions were prepared without using the aminoxy group-containing organosilicon compound.

TABLE 1

|  |  | Composition Sample No. | | | | | |
|---|---|---|---|---|---|---|---|
|  |  | 11 | | 12 | | 13 | |
|  |  | Example 1 | Example 2 | Example 3 | Example 4 | Comp. Ex. 1 | Comp. Ex. 2 |
| Base compound using polydiorganosiloxane | B-1 (parts) | 50 | 50 | — | — | 50 | 50 |
|  | B-2 (parts) | — | — | 50 | 50 | — | — |
| Base compound using polymer obtained from polyether | B-3 (parts) | 40 | 40 | — | — | 40 | 40 |
|  | B-5 (parts) | — | — | 40 | 40 | — | — |

TABLE 1-continued

| | | | | | | | | |
|---|---|---|---|---|---|---|---|---|
| Mixture of 94% $\left[\text{-Me}_2\text{SiO}\right]_2\text{-}\left[\text{MeSiO}\right]_2\text{-}$ ONEt$_2$ | (parts) | | 3 | 3 | 3 | 3 | — | — |
| and 6% $\left[\text{-Me}_2\text{SiO}\right]\text{-}\left[\text{MeSiO}\right]_3\text{-}$ ONEt$_2$ | | | | | | | | |
| Dibutyltin dilaurate | (parts) | | 1 | 1 | 1 | 1 | 1 | 1 |
| Curing atmosphere | | | 20° C., 50% RH | 50° C., 80% RH | 20° C., 50% RH | 50° C., 80% RH | 20° C., 50% RH | 50° C., 80% RH |
| State of cured composition | | | good | good | good | good | surface tackiness | severe surface tackiness |
| Degree of fouling (shown by lightness in terms of Munsell value) | Initial stage | 2 cm above joint | 9.5 | 9.5 | 9.5 | 9.5 | 9.5 | 9.5 |
| | | 2 cm below joint | 9.5 | 9.5 | 9.5 | 9.5 | 9.5 | 9.5 |
| | After 6-month exposure | 2 cm above joint | 9.0 | 9.0 | 9.0 | 9.0 | 9.0 | 8.0 |
| | | 2 cm below joint | 9.0 | 9.0 | 9.0 | 9.0 | 8.0 | 8.0 |
| | After 12-month exposure | 2 cm above joint | 8.5 | 8.5 | 8.5 | 8.5 | 7.5 | 7.0 |
| | | 2 cm below joint | 8.5 | 8.5 | 8.5 | 8.5 | 7.0 | 6.0 |
| Results of tensile test | Maximum tensile stress (kgf/cm$^2$) | | 7.4 | | 8.2 | | 6.8 | |
| | Elongation at break (%) | | 820 | | 850 | | 760 | |

| | | | Composition Sample No. | | | | |
|---|---|---|---|---|---|---|---|
| | | | 14 | | 15 | 16 | |
| | | | Comp. Ex. 3 | Comp. Ex. 4 | Comp. Ex. 5 | Example 5 | Example 6 |
| Base compound using polydiorganosiloxane | B-1 (parts) | | — | — | 90 | 40 | 40 |
| | B-2 (parts) | | 50 | 50 | — | — | — |
| Base compound using polymer obtained from polyether | B-3 (parts) | | — | — | — | — | — |
| | B-5 (parts) | | 40 | 40 | — | 50 | 50 |
| Mixture of 94% $\left[\text{-Me}_2\text{SiO}\right]_2\text{-}\left[\text{MeSiO}\right]_2\text{-}$ ONEt$_2$ | (parts) | | — | — | 3 | 3 | 3 |
| and 6% $\left[\text{-Me}_2\text{SiO}\right]\text{-}\left[\text{MeSiO}\right]_3\text{-}$ ONEt$_2$ | | | | | | | |
| Dibutyltin dilaurate | (parts) | | 1 | 1 | 1 | 1 | 1 |
| Curing atmosphere | | | 20° C., 50% RH | 50° C., 80% RH | 20° C., 50% RH | 20° C., 50% RH | 50° C., 80% RH |
| State of cured composition | | | surface tackiness | severe surface tackiness | good | good | good |
| Degree of fouling (shown by lightness in terms of Munsell value) | Initial stage | 2 cm above joint | 9.5 | 9.5 | 9.5 | 9.5 | 9.5 |
| | | 2 cm below joint | 9.5 | 9.5 | 9.5 | 9.5 | 9.5 |
| | After 6-month exposure | 2 cm above joint | 9.0 | 8.0 | 5.0 | 9.0 | 9.0 |
| | | 2 cm below joint | 8.0 | 8.0 | 4.0 | 9.0 | 9.0 |
| | After 12-month exposure | 2 cm above joint | 7.5 | 7.5 | 4.0 | 8.5 | 8.5 |
| | | 2 cm below joint | 7.0 | 6.0 | 4.0 | 8.5 | 8.5 |
| Results of tensile test | Maximum tensile stress (kgf/cm$^2$) | | 7.0 | | 7.7 | 8.6 | |
| | Elongation at break (%) | | 810 | | 910 | 750 | |

EXAMPLES 7 TO 13 AND COMPARATIVE EXAMPLES 6 TO 8

The organoaminoxy group-containing organosilicon compounds and curing catalyst shown in Table 2 were added to base compounds B-1, B-2, B-4, and B-5 respectively obtained in Preparation Examples 1, 2, 4, and 5, thereby preparing composition samples 21 to 28. Using these samples, the same tests as in Examples 1 to 6 were conducted. The results obtained are shown in Table 2.

It is noted that in Comparative Examples 6 and 7, the compositions were prepared without using the organoaminoxy group-containing organosilicon compound, while in Comparative Example 8, the composition was prepared without using the polymer obtained from a polyether.

TABLE 2

| | | Composition Sample No. | | | | |
|---|---|---|---|---|---|---|
| | | 21 | | 22 | | 23 |
| | | Example 7 | Example 8 | Comp. Ex. 6 | Comp. Ex. 7 | Comp. Ex. 8 |
| Base compound using polydiorganosiloxane | B-1 (parts) | 50 | 50 | 50 | 50 | — |
| | B-2 (parts) | — | — | — | — | 90 |
| Base compound using polymer obtained from polyether | B-4 (parts) | 40 | 40 | 40 | 40 | — |
| | B-5 (parts) | — | — | — | — | — |

TABLE 2-continued

| | | | | | | | |
|---|---|---|---|---|---|---|---|
| Mixture of 92%  and 8%  | (parts) | | 7 | 7 | — | — | 7 |
| Dibutyltin dilaurate | (parts) | | 1 | 1 | 1 | 1 | 1 |
| Curing atmosphere | | | 20° C., 50% RH | 50° C., 80% RH | 20° C., 50% RH | 50° C., 80% RH | 20° C., 50% RH |
| State of cured composition | | | good | good | surface tackiness | severe surface tackiness | good |
| Degree of fouling (shown by lightness in terms of Munsell value) | Initial stage | 2 cm above joint | 9.5 | 9.5 | 9.5 | 9.5 | 9.5 |
| | | 2 cm below joint | 9.5 | 9.5 | 9.5 | 9.5 | 9.5 |
| | After 6-month exposure | 2 cm above joint | 9.0 | 9.0 | 9.0 | 8.0 | 5.0 |
| | | 2 cm below joint | 9.0 | 9.0 | 8.0 | 8.0 | 5.0 |
| | After 12-month exposure | 2 cm above joint | 8.5 | 8.5 | 7.5 | 7.0 | 4.0 |
| | | 2 cm below joint | 8.5 | 8.5 | 7.0 | 6.0 | 4.0 |
| Results of tensile test | Maximum tensile stress (kgf/cm$^2$) | | 6.8 | | 6.6 | | 6.6 |
| | Elongation at break (%) | | 780 | | 810 | | 930 |

| | | | Composition Sample No. | | | | |
|---|---|---|---|---|---|---|---|
| | | | 24 Example 9 | 25 Example 10 | 26 Example 11 | 27 Example 12 | 28 Example 13 |
| Base compound using polydiorganosiloxane | B-1 (parts) | | — | — | — | — | — |
| | B-2 (parts) | | 60 | 30 | 50 | 50 | 50 |
| Base compound using polymer obtained from polyether | B-4 (parts) | | — | — | — | — | — |
| | B-5 (parts) | | 30 | 60 | 40 | 40 | 40 |
| Mixture of 92%  and 8%  | (parts) | | 7 | 7 | 2 | 5 | 9 |
| Dibutyltin dilaurate | (parts) | | 1 | 1 | 1 | 1 | 1 |
| Curing atmosphere | | | 50° C., 80% RH | 50° C., 80% RH | 50° C., 80% RH | 50° C., 80% RH | 50° C., 80% RH |
| State of cured composition | | | good | good | good | good | good |
| Degree of fouling (shown by lightness in terms of Munsell value) | Initial stage | 2 cm above joint | 9.5 | 9.5 | 9.5 | 9.5 | 9.5 |
| | | 2 cm below joint | 9.5 | 9.5 | 9.5 | 9.5 | 9.5 |
| | After 6-month exposure | 2 cm above joint | 9.0 | 9.0 | 9.0 | 9.0 | 9.0 |
| | | 2 cm below joint | 9.0 | 9.0 | 9.0 | 9.0 | 9.0 |
| | After 12-month exposure | 2 cm above joint | 8.0 | 8.5 | 8.5 | 8.5 | 8.5 |
| | | 2 cm below joint | 8.0 | 8.5 | 8.5 | 8.5 | 8.5 |
| Results of tensile test | Maximum tensile stress (kgf/cm$^2$) | | 7.2 | 8.3 | 7.5 | 7.4 | 7.3 |
| | Elongation at break (%) | | 900 | 690 | 850 | 820 | 860 |

While the invention has been described in detail and with reference to specific embodiments thereof, it will be apparent to one skilled in the art that various changes and modifications can be made therein without departing from the spirit and scope thereof.

What is claimed is:

1. A room temperature-curable composition comprising (A) 100 parts by weight of a silanol-terminated polydiorganosiloxane having a viscosity as measured at 25° C. of from 100 to 200,000 cSt;

(B) 5 to 500 parts by weight of a hydrolyzable silyl-terminated polymer obtained by the reaction of (I) an epoxy-terminated polyether represented by the formula wherein $R^1$ and $R^2$ each represents a divalent hydrocarbon group and m is a number of 10 to 500, with (II) at least one compound selected from the group consisting of (i) a heterocyclic compound having two imino groups per molecule, each imino group being bonded to two different carbon atoms, and (ii) an aromatic or heterocyclic compound having two mercapto groups bonded to carbon atoms constituting part of the aromatic or heterocyclic ring, and (III) an organosilicon compound having an epoxy group and a silicon-bonded hydrolyzable group;

(C) 0.05 to 60 parts by weight, per 100 parts by weight of the total of components (A) and (B), of an organosilicon compound having, on the average, more than two but less than three silicon-bonded organoaminoxy groups per molecule;

(D) 3 to 300 parts by weight, per 100 parts by weight of the total of components (A) and (B), of an inorganic filler; and (E) 0.001 to 20 parts by weight, per 100 parts by weight of the total of components (A) and (B), of a curing catalyst.

2. A composition as claimed in claim 1, wherein said heterocyclic compound (II)-(i) is one member selected from the group consisting of piperazine, 2,5-dimethylpiperazine, 1,4-diiminocyclopentane, perhydrophenazine, perhydropyrimidine, and perhydro-1,3,5-thiadiazine.

3. A composition as claimed in claim 1, wherein said aromatic or heterocyclic compound (II)-(ii) is one member selected from the group consisting of 2,5-dimercapto-1,3,4-thiadiazole, dimercaptotoluene, dimercaptoxylene, and dimercaptonaphthalene.

4. A composition as claimed in claim 1, wherein said organosilicon compound (III) is an organosilicon compound having an epoxy group and a silicon-bonded hydrolyzable group and is represented by the formula wherein $R^3$ represents a divalent hydrocarbon group or an unhydrolyzable divalent hydrocarbon group having a structure in which at least one of the methylene group(s) constituting the main chain of a divalent hydrocarbon group has been replaced by at least one atom selected from the group consisting of oxygen, nitrogen and sulfur, $R^4$ represents a monovalent hydrocarbon group, Y represents a silicon-bonded hydrolyzable group, and a is a number of 1 to 3.

5. A composition as claimed in claim 1, wherein said organosilicon compound (III) is a compound represented by the formula wherein $R^4$ represents a monovalent hydrocarbon group, $R^5$ represents an alkyl group having 1 to 6 carbon atoms, $R^6$ and $R^7$ each represents a divalent hydrocarbon group, and symbol a is a number of 1 to 3.

6. A composition as claimed in claim 1, wherein an component (C), the organic groups bonded to the nitrogen atoms in said organoaminoxy groups are ethyl.

7. A composition as claimed in claim 1, wherein said curing catalyst is selected from the group consisting of a tin carboxylate, an organotin carboxylate, an organotin oxide and the reaction product thereof with an ester, an organotitanate, an amine, an amine salt, a quaternary ammonium salt and a guanidine compound.

* * * * *